United States Patent [19]

Heinrichs et al.

[11] Patent Number: 5,449,199

[45] Date of Patent: Sep. 12, 1995

[54] STEERING ASSEMBLY FOR A MOTOR VEHICLE

[75] Inventors: Heinrich-Josef Heinrichs, Koblenz-Metternich; Reiner Wendling, Koblenz; Klaus Koch, Dahlheim, all of Germany

[73] Assignee: Stabilus GmbH, Koblenz, Germany

[21] Appl. No.: 140,758

[22] Filed: Oct. 21, 1993

[30] Foreign Application Priority Data

Oct. 22, 1992 [DE] Germany .................. 42 35 588.5

[51] Int. Cl.[6] .............................................. B62D 1/18
[52] U.S. Cl. ........................................................ 280/775
[58] Field of Search ............... 280/775, 777; 180/78; 74/493

[56] References Cited

U.S. PATENT DOCUMENTS

| | | | |
|---|---|---|---|
| 2,549,345 | 4/1951 | Tamboli | 74/493 |
| 4,209,074 | 6/1980 | York | 280/775 |
| 4,580,647 | 4/1986 | Peifer et al. | 280/775 |
| 4,691,587 | 9/1987 | Farrand et al. | 74/493 |
| 4,993,522 | 2/1991 | Wagner | 188/269 |
| 5,071,163 | 12/1991 | Heinrichs et al. | 280/775 |
| 5,113,716 | 5/1992 | Dumschat et al. | 74/493 |

FOREIGN PATENT DOCUMENTS

| | | |
|---|---|---|
| 0424629 | 2/1991 | European Pat. Off. . |
| 2440303 | 5/1980 | France . |
| 3536285 | 4/1987 | Germany . |
| 8528941 | 8/1989 | Germany . |
| 994524 | 6/1965 | United Kingdom . |

OTHER PUBLICATIONS

Patent Abstracts of Japan, vol. 016214, May 20, 1992, JP-4039164 (Abstract).

*Primary Examiner*—Kenneth R. Rice
*Attorney, Agent, or Firm*—Brumbaugh, Graves, Donohue & Raymond

[57] ABSTRACT

According to an illustrative example, a steering column is capable of telescopic length adjustment. A positioning device is provided for securing the steering column in a selected length position. The positioning device is selectively locked and unlocked by an electric mover fastened to the positioning device. The mover is controlled through a flexible line from a push button. The push button is easily accessible to the driver of the vehicle.

57 Claims, 4 Drawing Sheets

STEERING ASSEMBLY FOR A MOTOR VEHICLE

BACKGROUND OF THE INVENTION

This invention relates to a steering assembly for being mounted in a motor vehicle in which the position of the steering wheel can be adapted to the personal requirements of the driver.

STATEMENT OF THE PRIOR ART

From German Publication DE-39 30 372A1 corresponding to U.S. Pat. No. 5,071,163 a hydropneumatic positioning device for a steering column is known, the hydropneumatic positioning device being an integral part of the steering column. In this known assembly an internal tube of the steering column which carries the steering wheel is connected with the hydropneumatic positioning device such that this internal tube is non-rotatable but axially movable with respect to the hydropneumatic positioning device. One end of a positioning cylinder, which end is remote from the piston rod, is mounted in a bearing fixed with respect to the bodywork of the respective vehicle. For positioning the steering wheel a pin is located in the center of the steering wheel. For allowing adjustment of the steering wheel the pin is acted upon by the driver such that a valve in a piston of the hydropneumatic positioning device is opened. By opening this valve a passage is opened between two working chambers of the hydropneumatic positioning device such that the cylinder can be axially moved with respect to the steering column. When the steering wheel has been brought into the desired position, the valve is closed again such that the steering wheel is axially fixed.

It is a disadvantage of the known device that the driver must act by hand onto the pin for opening the valve and thereby unlocking the steering column for length adjustment. As the driver has to act upon the valve actuating pin, he cannot easily move the steering wheel with both hands. Even if he can use both hands for axial movement of the steering wheel, the position of his body and more particularly of his arms and his hands does not correspond to the normal driving position due to the simultaneous action onto the valve actuating pin. Such, after having positioned the steering wheel it may turn out that the new position is not the most comfortable position desired which corresponds to the normal driving position of the driver, when there is no further need of acting onto the valve actuating pin.

From German Utility Model G 85 28 941.8 a further steering assembly is known in which a first fluid-based positioning device is used for length adjustment of a steering column and a further fluid-based positioning device is used for adjusting a tilting position of the steering column with respect to the bodywork of the vehicle.

OBJECT OF THE INVENTION

It is an object of the present invention to provide a steering assembly in which the position of the steering wheel can be adjusted to the personal requirements of a driver such that the driver can easily find the most comfortable position of the steering wheel.

A further object of the invention is to allow the driver the positioning of the steering wheel with both arms and both hands without the necessity of simultaneously using his hand for unlocking a positioning device.

A further object of the invention is to locate a control element for unlocking the positioning device such that the driver can act thereon for unlocking the positioning device in having his body, his arms and his hands in a most comfortable position corresponding to the most comfortable driving position with both his hands being in gripping engagement with the steering wheel.

It is a further object of the invention to obtain a steering assembly with only small space requirements for the positioning device or the positioning devices.

It is a further object of the present invention to provide a steering assembly which can be easily installed in the bodywork of a motor vehicle.

It is a further object of the present invention to provide a steering assembly in which the connection between a control unit and the at least one positioning device is flexible such that the control unit can be located at the most convenient location for the driver such that the driver can act onto the control unit in his normal sitting position on the driver's seat.

It is a further object of the present invention to provide a steering assembly in which the positioning device or positioning devices and the actuating unit or actuating units can be easily preassembled and installed as preassembled components within the bodywork of the motor vehicle.

SUMMARY OF THE INVENTION

In consideration of at least one of the above objects a steering assembly is provided for being mounted in a motor vehicle. The steering assembly comprises a steering wheel. The steering wheel is positionable in accordance with the driver's wishes or requirements by at least one fluid-based positioning device. An actuating unit is allocated to the positioning device for selectively permitting adjustment of the positioning device or locking the positioning device in a position corresponding to a desired position of the steering wheel.

By a fluid-based positioning device a positioning device is to be understood in which the relative position of two components of the positioning device is locked by a fluid such as a liquid or a gas. Correspondingly, the term "fluid-based positioning device" is to comprise hydraulic, hydropneumatic and pneumatic positioning devices.

A plurality of positioning devices may be provided which are allocated to different positioning directions of the steering wheel.

The steering wheel may e.g. be carried by a steering column having a longitudinal axis. This steering column may be adjustable in length along its longitudinal axis and may be lockable in a plurality of length adjustment positions by a first fluid-based positioning device.

Alternatively or additionally, the steering wheel may be carried by a steering column having a longitudinal axis, and the steering column may be tiltable about a tilting axis and lockable in a plurality of tilting positions by a further fluid-based positioning device. The tilting axis may e. g. be substantially transverse to the longitudinal axis, and in particular it may be substantially horizontal and transverse to a normal driving direction of the respective motor vehicle.

In case of a steering column with a longitudinal axis this steering column may comprise telescopic steering torque transmission means extending along the longitudinal axis. This telescopic steering torque transmission means have a first end portion in torque transmitting connection with the steering wheel and a second end portion for operational connection with a steerable wheel means of the motor vehicle. The connection between this second end portion and the steerable wheel means may be established by usual steering gear means. The steering torque transmission means may be rotatably mounted about the longitudinal axis thereof by bearing means carried by the bodywork of the motor vehicle. The telescopic torque transmission means may comprise at least two torque transmittingly engaged torque transmission components telescopically movable with respect to each other along the longitudinal axis of the steering column. A first length-adjustable fluid-based positioning device may be connected for axial force transmission with both said torque transmission components for locking said torque transmission components in a plurality of relative length positions.

The bearing means may be carried by a steering column carrier unit. This steering column carrier unit may be tiltable about a tilting axis, and a second fluid-based positioning device may be provided for locking the steering column carrier unit in a plurality of tilting positions about the tilting axis.

The first length-adjustable fluid-based positioning device may be substantially stationary with respect to the bodywork of the motor vehicle in circumferential direction about the longitudinal axis. In such a design the first length-adjustable fluid-based positioning device may be located radially spaced from the longitudinal axis of the steering column and may be connected with both torque transmission components through respective first and second rotatable connecting means rotatable with respect to said torque transmission components, respectively, about the longitudinal axis of the steering column.

According to a preferred embodiment, one of the at least two torque transmittingly engaged torque transmission components is rotatably mounted about the longitudinal axis of the steering column within a first telescopic carrier tube member and axially fixed with respect thereto. Another one of the at least two torque transmittingly engaged torque transmission components may be rotatably mounted within a second telescopic carrier tube member and axially fixed with respect thereto. The first and the second carrier tube members are telescopically engaged with each other for relative length adjustment along the longitudinal axis of the column. These first and second telescopic carrier tube members are non-rotatable about the longitudinal axis with respect to the bodywork of the motor vehicle. The first fluid-based positioning device is connected with both the first and the second telescopic carrier tube members for axial force transmission.

Moreover, the second carrier tube member may be tiltably mounted with respect to the bodywork about a tilting axis and may be connected with a support bracket of the bodywork of the motor vehicle through a second length-adjustable fluid-based positioning device.

The at least one fluid-based positioning device may contain a filling of locking fluid such as liquid, independent of external fluid supply.

According to a preferred embodiment, the at least one fluid-based positioning device comprises at least two positioning device components movable with respect to each other and at least two working chambers containing a locking fluid. These working chambers have variable volumina variable in opposite senses in response to relative movement of the positioning device components. These working chambers are interconnected by fluid passage means. These fluid passage means are provided with valve means. The positioning device components are selectively movable and locked with respect to each other in response to opening and closing of the valve means, respectively. The actuating unit is adapted for acting onto the valve means.

The at least one positioning device may be a cylinder piston rod unit having an axis such as shown in the above-mentioned DE-39 30 372A1 and the corresponding U.S. Patent as mentioned above.

When using such a cylinder piston rod unit the actuating unit may be secured to the cylinder member or to the piston rod member thereof. E.g., the actuating unit may act through a control rod guided along an axial bore of the piston rod on a valve unit provided within a piston member fastened to the piston rod and separating two working chambers from each other. This is in detail illustrated and described in the German Publication DE-39 30 372A1 and the corresponding U.S. Patent as mentioned above.

Generally spoken, the actuating unit may act in a direction substantially along the axis of the cylinder piston rod unit onto a valve control member of the valve means.

The actuating unit may be connected by a flexible control line with a control unit. This control unit comprises a control member accessible to the driver of the motor vehicle when sitting on the driver's seat. The control member may be e.g. a push button fastened to the steering wheel. Alternatively, the control member may be a foot pedal accessible to the driver's foot, when the driver sits on the driver's seat.

The actuating unit may be a control fluid-operated actuating unit connected by a control fluid conduit and preferably by a flexible tube with a control unit. The control fluid may be a pressurized gas or a liquid. Preferably, the control fluid is completely separated from the locking fluid.

Alternatively, the actuating unit may be an electrically operated actuating unit connected by electric power transmission means with an electric control unit, preferably by a flexible cable.

E.g., the electrically operated actuating unit comprises a electromotor or an electromagnet or a piezo-ceramic driver.

The actuating unit may be releasably or non-releasably secured to the fluid-based positioning device. E.g., it may be screwed to a piston rod or a cylinder of a cylinder piston unit representing the positioning device.

The positioning device may be subject to influence of a security system which prevents unlocking of the positioning device under certain circumstances. Such a security system may comprise sensor means sensing at least one operational parameter of the vehicle. In this case, the security system can prevent adjustment of the steering assembly at a predetermined status of the operational parameter.

According to a further aspect of the present invention, the at least one fluid-based positioning device is connected with the steering wheel by non-linear movement transmission means. In such a design, one obtains an increased freedom as to the location of the positioning device. On can arrange the positioning device at a location which corresponds to the availability of respective space within a bodywork.

E.g., the second fluid-based positioning device may be located substantially parallel to the longitudinal axis of the steering column and may be connected to the steering column by a lever system deformable in response to tilting of the steering column about the tilting axis.

In case of provision of two or more positioning devices, the actuating units may be controllable by a common control unit. E.g., the actuating units may be controlled by a common control element for simultaneous locking and unlocking of the at least two positioning devices. This means that the driver after having acted upon the common control element can move the steering wheel in accordance with all movement possibilities allowed by the steering assembly and more particularly both in longitudinal direction of the steering column and in tilting direction of the steering column. It is, however, not excluded that for the actuating units of different positioning devices different control elements are provided such that the driver can move the steering wheel selectively in accordance with various movement possibilities. At least one actuating unit may be connected with a control unit which is adapted for maintaining the positioning device through the respective actuating unit temporarily in an unlocked condition without manual action onto the control unit. Such, the driver can unlock the respective positioning device, can hereupon bring the driving wheel to the desired position and can hereupon lock the positioning device again and thereby secure the steering wheel in the selected position. This is a solution in which the driver can fully use his hands in an optimum position of his body and his arms for positioning the steering wheel without any necessity of simultaneously acting on a control element for the actuating unit.

This solution may still be improved, when the steering wheel assembly is designed such that the driving wheel always remains in a selected position, when the driver removes his hands from the steering wheel. One can obtain this behaviour in providing sufficient friction within the steering assembly for a compensation for forces acting onto the steering assembly. More particularly, one can compensate for gravitational forces acting onto the steering assembly by such friction. Under these circumstances, the driver can most easily adjust the steering wheel according to his wishes. He unlocks the positioning device, hereupon he applies both hands to the steering wheel and adjusts the steering wheel to the desired position. This can be easily done, because only frictional and gravitational forces are to be overcome. Hereupon, the driver removes his hands from the steering wheel and the steering wheel remains in the selected position, though the positioning device is unlocked. Hereupon, the driver can act with at least one of his hands onto the control element of the control unit controlling the actuating unit such that the actuating unit locks the positioning device again.

One can easily understand that a similar positive behaviour is also obtainable when using a pedal as control element for the driver's control of the actuating unit and of the positioning device through the actuating unit.

The actuating unit may be a structural part of the at least one fluid-based positioning device. In such a design of the positioning device and the actuating unit, the fluid-based positioning device may be connected to the steering assembly or to the bodywork of the motor vehicle through the actuating unit.

Returning now to the above-discussed security system one can easily understand that this security system may be used for preventing movability of the driving wheel under driving conditions. E.g., starting of the motor or selection of a gear stage may provide a signal which automatically locks the steering wheel and prevents unlocking of the steering wheel. This is of high interest under the security point of view.

It is not excluded that at least one of the positioning devices provides a prestress biasing the steering wheel towards a terminal position. This embodiment may be used particularly in cases in which the control element controlling the actuating unit is either actuated by the driver's foot or is provided on the steering wheel in a position near to a hand of the driver, when the driver grips the steering wheel for bringing it into a desired position.

The various features of novelty which characterize the invention are pointed out with particularity in the claims annexted to and forming a part of the disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWINGS

The invention will be explained in greater detail hereafter with reference to embodiments shown in the accompanying drawings in which

FIGS. 4a to 4b show some embodiments of actuating units for combination with a positioning device of.

DETAILED DESCRIPTION OF THE PREFERRED EMBODIMENTS

Figure 1:
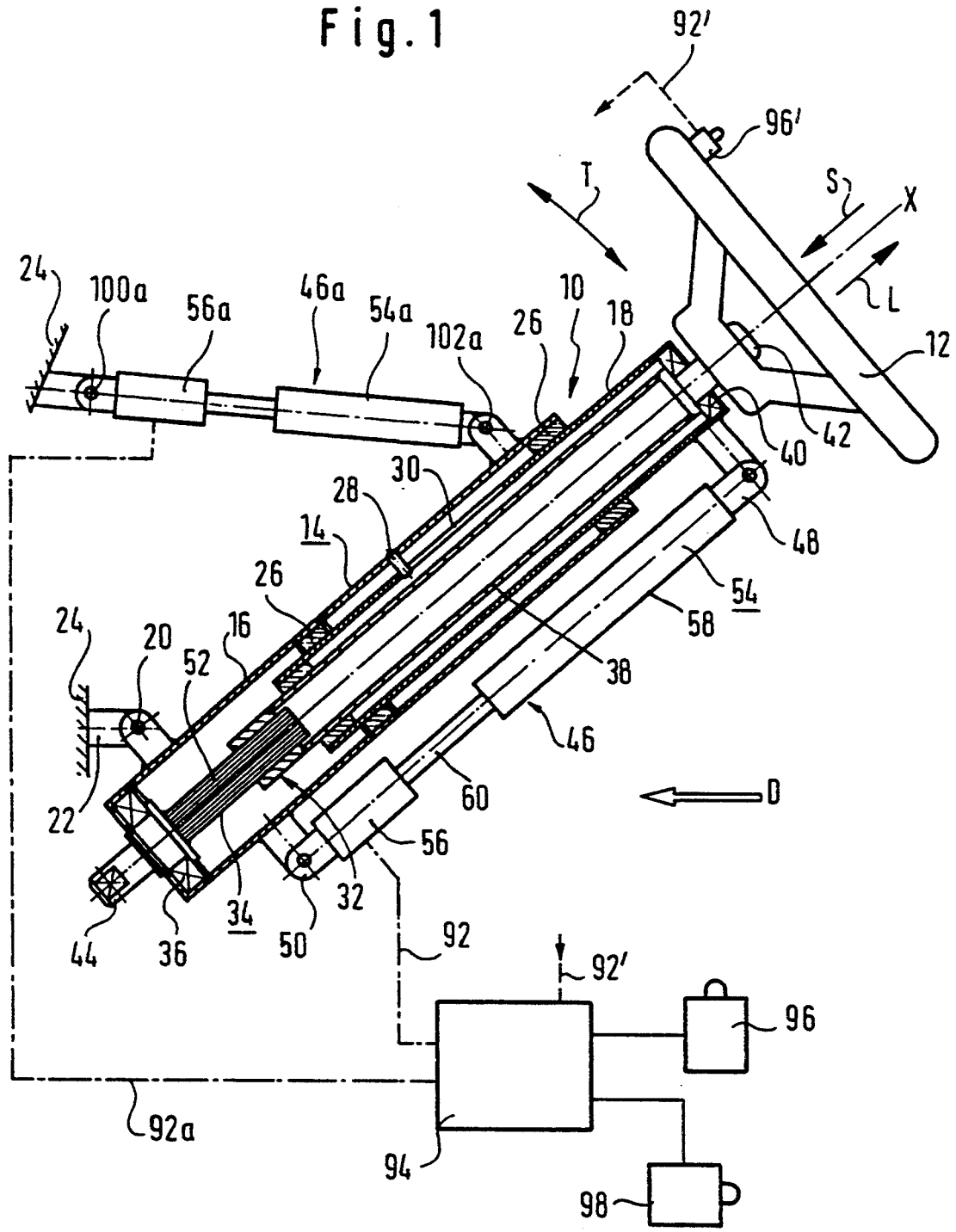
FIG. 1 shows a steering assembly partially in section with control means allocated thereto for unlocking and locking the respective position of the steering wheel.

In FIG. 1 one can recognize a steering column 10 with a steering wheel 12. The steering column comprises a tubular column housing 14. This column housing 14 comprises a second housing tube 16 and a first housing tube 18. The second housing tube 16 is tiltably mounted about a tilting axis 20 to a bracket 22 which is fixed to the bodywork 24 of a motor vehicle. The+tilting axis 20 is substantially horizontal and transverse to the normal driving direction D of the motor vehicle. The first housing tube 18 is telescopically movable with respect to the second housing tube 16 along a longitudinal axis X of the steering column 10. The first housing tube 18 is slidingly guided within the second housing tube 16 by slide bearings 26 and is non-rotatable with respect to the second housing tube 16 by a pin 28 of the second housing tube 16 engaging into a slot 30 of the first housing tube 18. A telescopic torque transmission shaft 32 is accommodated within the tubular column housing 14. The telescopic torque transmission shaft 32 comprises a second shaft component 34 which is rotatably mounted and axially fixed with respect to the second housing tube 16 by a bearing 36. Further, the telescopic torque transmission shaft 32 comprises a first shaft component 38 which is rotatably mounted within the first housing tube 18 by a bearing 40, which bearing axially secures the first shaft component 38 with respect to the first housing tube 18.

The steering wheel 12 is fastened to the upper end 42 of the telescopic torque transmission shaft 32. The lower end of the second shaft component 34 is provided with a torque transmitting shaft section 44 which can be operationally connected with steered wheels of a motor vehicle through usual steering gear means.

A first length-variable positioning device 46 is connected by one end 48 with the first housing tube 18 and by a second end 50 with the second housing tube 16. The positioning device 46 is length-variable and can be selectively unlocked for allowing length variation or locked for maintaining a predetermined length. When the positioning device 46 is unlocked, the steering column 10 can be varied in length by moving the steering wheel 12 in the shortening direction S or in the lengthening direction L. When the steering wheel 12 is moved by the hands of the driver in direction S or in direction L, the housing tube 18 is telescopically moved with respect to the housing tube 16 and simultaneously, the shaft component 38 is telescopically moved with respect to the shaft component 34. The shaft components 34 and 38 are always in torque transmitting connection by teeth means or spline means at 52. When a desired position of the steering wheel 12 has been obtained, the positioning device 46 is locked so that telescopic movement is prevented.

Figure 3:
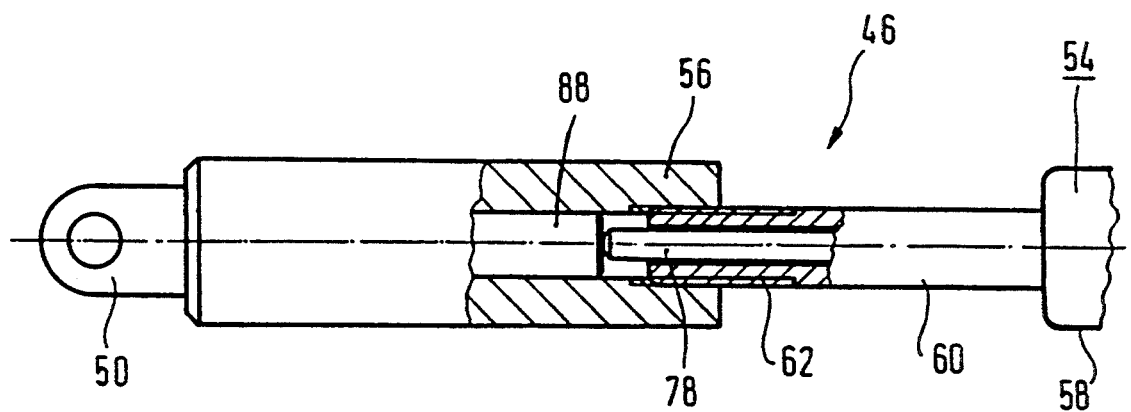
FIG. 3 shows an actuating unit in combination with a positioning device partially in section.

The positioning device 46 is shown in more detail in FIG. 3. One can recognize in FIG. 3 a fluid-operated cylinder piston rod unit 54 with an actuating unit 56. The cylinder piston rod unit 54 comprises a cylinder 58 and a piston rod 60. The actuating unit 56 is fastened to the piston rod 60 by screw means 62.

As shown in FIGS. 1 and 3, the cylinder 58 has a fastening eye 48 for being fixed to the first housing tube 18. The piston rod 60 has external thread means 62 for being fastened to the actuating unit 56. As mentioned above, the cylinder piston rod unit 54 may be constructed as described in DE-39 30 372A1 and U.S. Pat. No. 5,071,163, i.e., a control rod 78 (see FIG. 3) is guided along an axial bore in the piston rod 60 and acts on a valve unit provided within a piston member fastened to the piston rod and separating two working chambers within the cylinder 58 from each other. Such cylinder piston units 54 are well known in the art and need not be disclosed in detail. The inward movement of the piston rod 60 with respect to the cylinder 58 occurs against the resistance of the fluid pressure in the cylinder 58, which pressure acts upon the cross-sectional area of the piston rod 60 in the well known way. On the other hand, outward movement of the piston rod 60 is assisted by this pressure again acting onto the cross-sectional area of the piston rod 60.

The valve unit in the piston member of the cylinder piston unit can be opened by the actuating unit 56 which is shown in more detail in FIG. 5a. This actuating unit 56 comprises a housing 84 which is fastened by thread means 62 to the piston rod 60. Within the housing 84 there is accommodated an electromagnetic coil 86 surrounding an electromagnetic armature 88. This armature 88 is biased into a rest position by a spring 90 and is in alignment with the control rod 78 extending through the central bore 80 of the piston rod 60. The electromagnetic coil 86 is connected by a flexible current supply line 92 with a control unit 94 as shown in FIG. 1. When a current is supplied to the electromagnetic coil 86, the armature 88 is drawn in FIG. 4a to the right and acts upon the control rod 78 such as to open the valve unit in the cylinder 58. Then, the positioning device 46 is unlocked, and the steering wheel 12 can be moved in the directions S and L.

The control unit 94 is connected with a control element 96. This control element 96 is a mono-stable push button. As long as the push button is pressed down, the coil 86 is energized and the valve unit in the cylinder 58 is open so that the steering wheel 12 can be moved by hand in the directions L and S to a desired position. When the desired position has been obtained, the push button 96 is released so that the valve unit is closed again, the cylinder piston rod unit 54 is locked and the steering wheel 12 is not further movable. The control element 96 may be a pedal accessible to the driver's foot, when the driver is sitting on the driver's seat. Alternatively, the push button 96' may be located on the steering wheel 12 in a position most convenient for access by a driver's finger, when the driver has the respective hand in a position for axial movement of the steering wheel 12. A sensor 98 is also connected with the control unit 94. This sensor 98 senses an operational parameter of the vehicle motor. When, e. g., the motor is started, the sensor 98 gives a signal to the control unit 94 saying that the coil 86 may not further be energized so that the valve unit of the cylinder piston unit 54 cannot be opened and the steering wheel 12 is secured in axial direction X, even when the operator acts upon the push button 96 or 96'. The push button 96' may be connected with the control unit 94 through a further flexible line 92'.

Figure 4A:
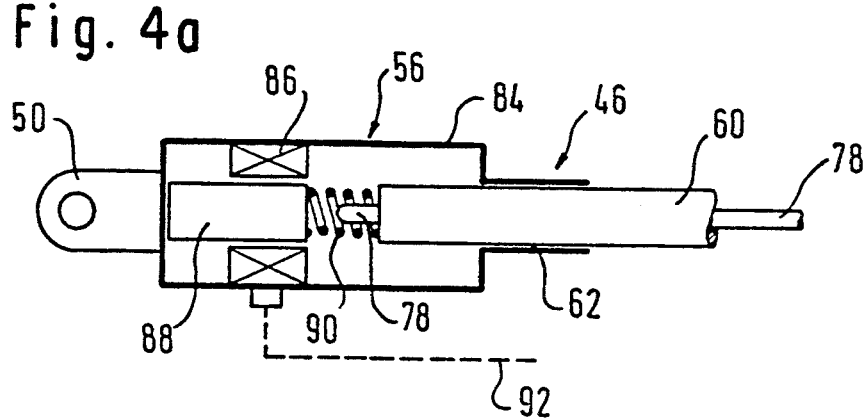

One can see from FIGS. 1, 3, and 4a that the actuating unit 56 is a structural component of the positioning device 46. The housing 84 of the actuating unit 56 is provided with a fastening eye for being connected to the second housing tube 16.

As shown in FIG. 1, the tubular column housing 14 may be tilted about the tilting axis 20 and may be secured in a selected tilting position by a second positioning device 46a which again comprises a cylinder piston unit 54a and an actuating unit 56a which may be identical with the units 54 and 56 as shown in FIGS. 5a to 5d. The positioning device 46a is pivotally attached at 100a to the bodywork 24 and at 102a to the tubular column housing 14. The actuating unit 56a is connected by a flexible line 92a with the control unit 94 so that the positioning device 46a may be unlocked simultaneously with the unlocking of the positioning device 46. Then, the steering wheel 12 can be simultaneously moved in one of the longitudinal directions S and L and in the tilting direction T.

The cylinder piston unit 54 is preferably a hydropneumatic unit which is partially filled with hydraulic fluid for locking purposes and includes a gas-filled compensating chamber separated from the hydraulic fluid by a partition. As is well known in the art, the cylinder piston unit 54 may be arranged to provide positive locking of the piston rod 60 in the inward direction and elastic locking in the outward direction, and vice versa.

Alternatively, as shown in DE-39 30 372A1 and U.S. Pat. No. 5,071,163, the piston unit within the cylinder 58 may be provided with an extension member having the same diameter as the piston rod 60 and extending sealingly through a fixed partition member which separates the hydraulic fluid from a chamber vented to atmosphere. In this case, no biasing action is exerted on the piston rod by the pressurized fluid when the valve means interconnects the working chambers within the cylinder 58 is opened.

It is assumed now that a cylinder piston rod unit 54 as just described is used in the steering assembly of FIG. 1. As mentioned, no biasing action exists when the passage valve unit between the cylinder working chambers is open. On the other hand, there exists a friction within the cylinder piston rod unit 54 and also a friction within the steering column 10. These frictional forces are high enough or are selected as high as to maintain the length position of the steering wheel 12, even when the cylinder piston rod unit 54 is unlocked. This allows a control as follows: The control element 96 (FIG. 1) is now a bi-stable push button. A first push operation results in energization of the electromagnetic coil 86 (FIG. 5a) so that the control rod 78 is depressed and the valve unit is opened. Now, the driver can move the steering wheel 12 in one of the directions S and L without a further action onto the push button 96 or 96', until a desired position of the steering wheel 12 is obtained. Then, the driver may again act on the bi-stable push button 96 with the result that the valve unit is closed again and the new position of the steering wheel 12 is secured. It is easy to understand that in such a design the driver is fully free in his body and arm position to adapt the position of the steering wheel in the most convenient way. It is easily understandable that the bi-stable control element 96 can be replaced by a control component, with a timer such that after a first action onto the push button the valve unit remains open for a predetermined time period of such length as to allow to a driver the positioning of the steering wheel. After that predetermined time the passage valve unit is automatically closed again. All other functions are the same as described in connection with FIG. 1. The second positioning device 46a of FIG. 1 may also be replaced by a combination of the aformentioned positioning device and an actuating unit as shown in FIG. 4a.

In a further embodiment of the cylinder piston rod unit also known in the prior art, the cylinder 58 is surrounded by an external tube 116 such as to form an annular bypass passage between the liquid-filled working chambers within the cylinder. The bypass passage may be selectively closed or opened by a valve member which is combined with the control rod 78. The control rod 78 may be opened by an actuating unit 56 which is fastened to the cylinder 58 or the external tube.

Figure 4B:
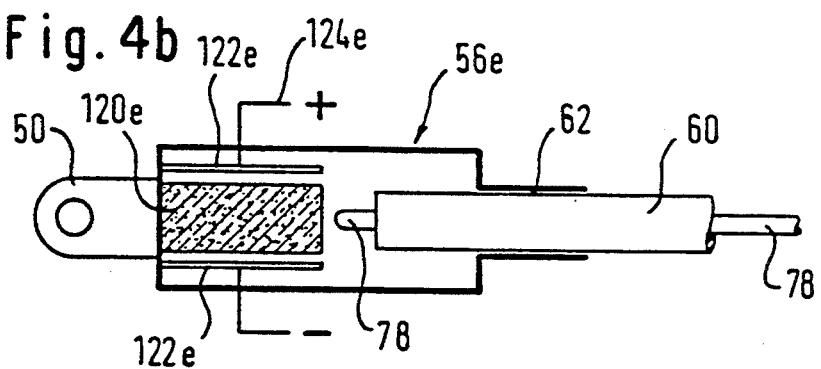
Figure 4C:
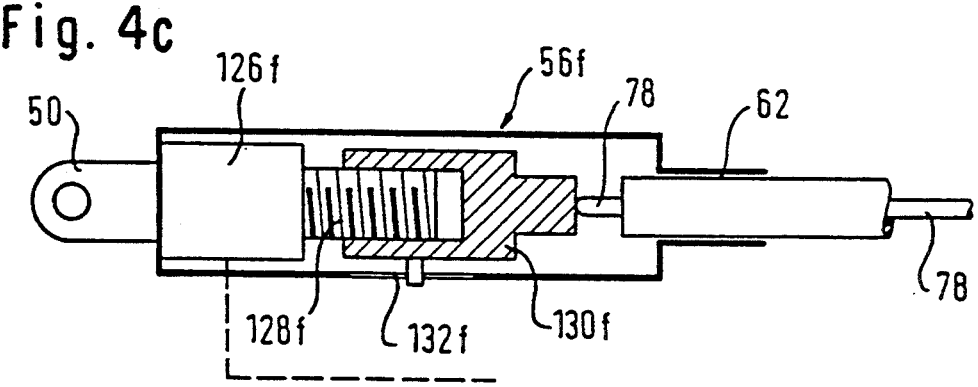
Figure 4D:
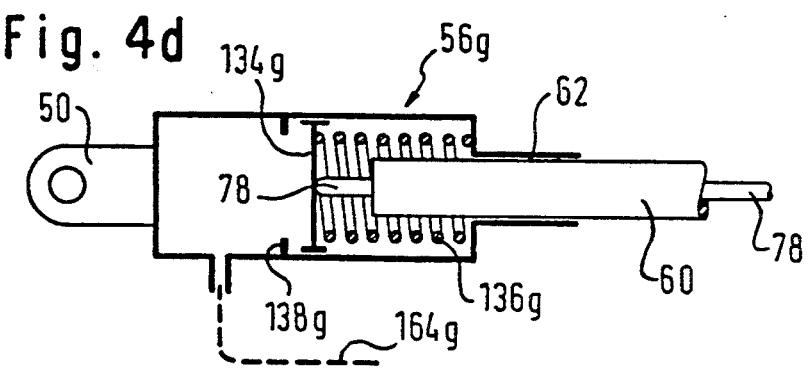

All embodiments of the cylinder piston rod unit described above may be equipped with alternative actuating units according to FIGS. 4b, 4c and 4d.

According to FIG. 4b, the housing 56e accommodates a piezoceramic body 120e which is subject to an electric field applied thereto by capacitor plates 122e and a high voltage source 124e. A high voltage may be applied to the piezoceramic body 120e through the control unit 94 of FIG. 1. Thus, the piezo-ceramic body 120e is lengthened and acts upon the control rod 78.

In the embodiment of FIG. 4c, the housing 56f accommodates an electric motor 126f driving a screw shaft 128f. This screw shaft 128f is in threaded engagement with a nut member 130f which is prevented from rotation by rotation preventing means 132f. By rotation of the electric motor 126f the nut member 130f may be axially moved such as to act onto the control rod 78 and to open the valve unit in the cylinder piston unit 54.

According to the embodiment of FIG. 4d, the housing 56g is a fluid cylinder containing a piston 134g. This piston 134g is biased by a helical spring 136g towards an abutment 138g. The cylinder 56g is connected by a flexible tube 164g with a hydraulic control unit replacing the control unit 94 of FIG. 1. By operation of the control element 96 an actuating fluid may be admitted from a pressure reservoir or a pump to the cylinder 56g such that the piston 134g is moved to the right, acts onto the control rod 78 and opens the valve unit.

Each actuating unit of FIGS. 4a to 4d can be combined with each cylinder piston rod unit described above. Further, possible embodiments and details are described in the European Publication 423 828 A1.

FIG. 3 shows the combination of the actuating unit 56 of FIG. 4a with a cylinder piston rod unit 54.

In FIG. 2, one can see again a steering column 10h which may be identical to the steering column 10 of FIG. 1. The first positioning device as shown in FIG. 1 at 46 is not illustrated for clarity reasons. One can see, however, a second positioning device 46h which is intended for tilting movement of the steering column 10h about the tilting axis 20h. The positioning device 46h may be any of the types described and may be equipped with one of the actuating units of FIGS. 4a to 4d. The positioning device 46h acts onto the lever 142h which is pivotally mounted at 144h on the bodywork 24h of the respective vehicle. The lever 142h is engaged by a pin 147h with a linear slot 146h provided on the second housing tube 16h corresponding to the housing tube 16 of FIG. 1. When the positioning device 46h is unlocked by a respective actuating unit, the piston rod 60h may be axially moved with respect to the cylinder 58h, such permitting a tilting movement of the steering column 10h about the tilting axis 20h. During this tilting movement the pin 147h slides along the slot 146h. When the positioning device 46h is locked again, the steering column 10h is secured in its new tilting position.

Figure 2:
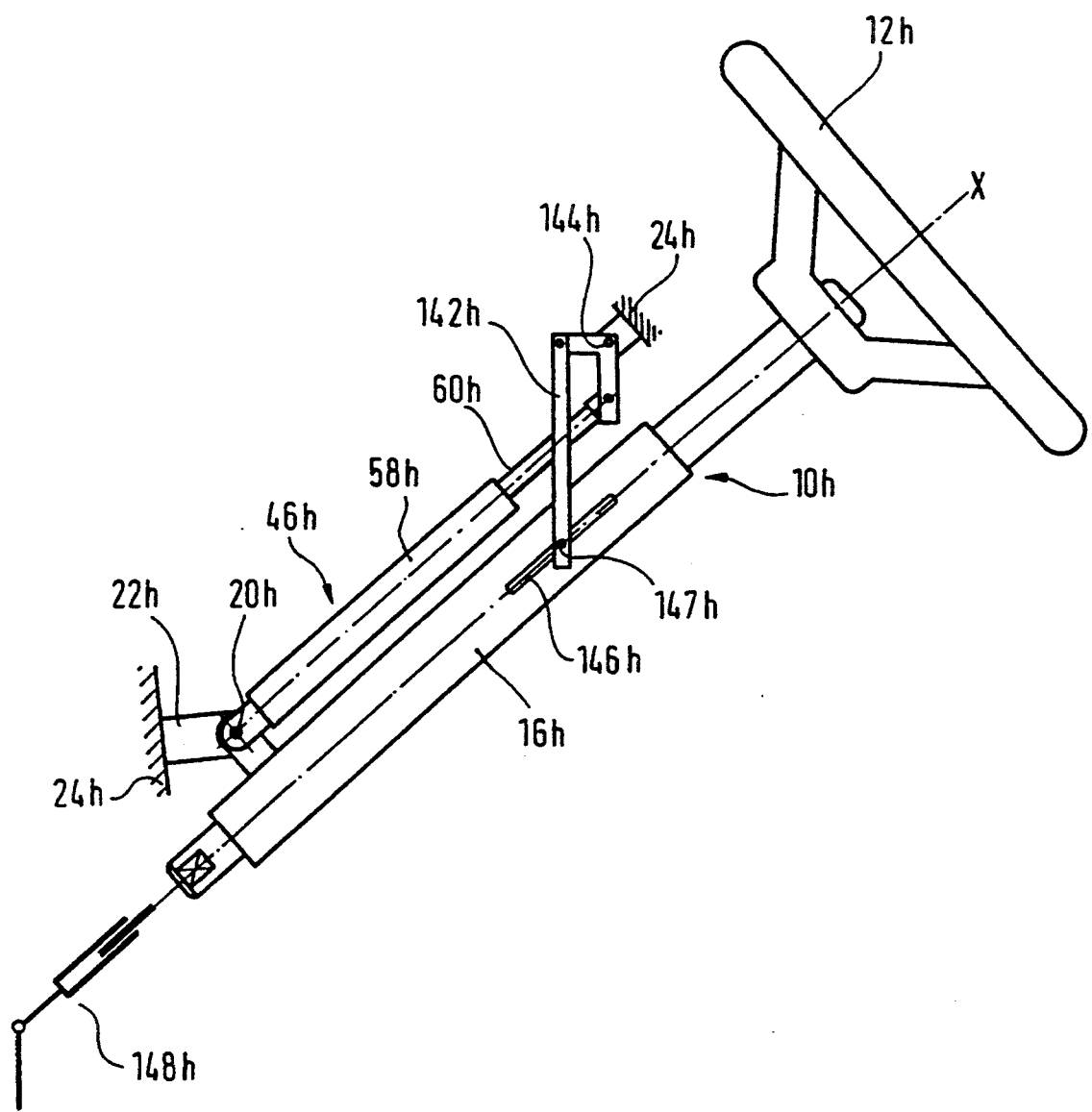
FIG. 2 shows a further embodiment of a steering assembly in which the positioning device for securing a steering column in different tilting positions is arranged in parallel with the axis of the steering column.

One can easily understand that in the design of FIG. 2 the space requirement of the positioning device 46 is considerably reduced. The design of FIG. 2 can be combined with any of the embodiments of FIGS. 1, 3, and 4a to 5d. It is to be noted, however, that the concept of FIG. 2 can also be used for tilting and securing any type of steering column and is not necessarily combined with the above described features of the present invention.

In the embodiment of FIG. 4c, the thread means between the shaft 128f and the nut 130f are preferably self-blocking such that the position of the nut 130f is always secured, when the motor 126f is at a standstill. The motor 126f is drivable in both directions.

The actuating fluid in case of an embodiment according to FIG. 4d may be a liquid or a pressurized gas. The tube 164g is preferably a flexible tube so that it can be easily installed with the bodywork of the motor vehicle.

One can easily understand that in case of a cylinder piston, both working chambers of the cylinder piston unit 54 may be filled also with a pressurized gas instead of a liquid. In such case, the sealed partition wall may be eliminated.

In FIG. 2, one can see in a diagrammatic way a torque transmission system 148h for transmitting a steering torque from the steering wheel 12h to the steered wheels of the vehicle (not shown).

While specific embodiments of the invention have been shown and described in detail to illustrate the application of the inventive principles, it will be understood that the invention may be embodied otherwise without departing from such principles.

We claim:

1. A steering assembly for being mounted in a motor vehicle comprising a steering wheel, said steering wheel being positionable in accordance with the driver's wishes by at least one fluid-based positioning device, an actuating unit being allocated to said positioning device for selectively permitting adjustment of said positioning device or locking said positioning device in a position corresponding to a desired position of said steering wheel, said actuating unit being one of a control fluid-operated actuating unit connected by a control fluid conduit with a fluid control unit and an electrically-operated actuating unit connected by an electric power transmission means with an electric control unit.

2. A steering assembly as set forth in claim 1, a plurality of positioning devices being provided, said positioning devices being allocated to different positioning directions of said steering wheel.

3. A steering assembly as set forth in claim 1, said steering wheel being carried by a steering column having a longitudinal axis, said steering column being adjustable in length along said longitudinal axis and being lockable in a plurality of length adjustment positions by a first positioning device.

4. A steering assembly as set forth in claim 1, said steering wheel being carried by a steering column having a longitudinal axis, said steering column being tiltable about a tilting axis and being lockable in a plurality of tilting positions by a second positioning device.

5. A steering assembly as set forth in claim 4, said tilting axis being substantially transverse to said longitudinal axis.

6. A steering assembly as set forth in claim 5, said tilting axis being substantially horizontal and transverse to a normal driving direction of said motor vehicle.

7. A steering assembly as set forth in claim 1, said steering assembly comprising a steering column, said steering column having a longitudinal axis and comprising telescopic steering torque transmission means extending along said longitudinal axis, said telescopic steering torque transmission means having a first end portion in torque transmitting connection with said steering wheel and a second end portion for operational connection with steerable wheel means of said motor vehicle, said steering torque transmission means being rotatably mounted about said longitudinal axis by bearing means, said telescopic torque transmission means comprising at least two torque transmittingly engaged torque transmission components telescopically movable with respect to each other along said longitudinal axis, a first length-adjustable, fluid-based positioning device being connected for axial force transmission with both said torque transmission components for locking said torque transmission components in a plurality of relative length positions.

8. A steering assembly as set forth in claim 7, said bearing means being carried by a steering column carrier unit, said steering column carrier unit being tiltable about a tilting axis, a second fluid-based positioning device being provided for locking said steering column carrier unit in a plurality of tilting positions about said tilting axis.

9. A steering assembly as set forth in claim 7, said first length-adjustable, fluid-based positioning device being substantially stationary with respect to a bodywork of said motor vehicle in circumferential direction about said longitudinal axis, said first length-adjustable, fluid-based positioning device being located radially spaced from said longitudinal axis and being connected with both torque transmission components through respective first and second rotatable connecting means rotatable with respect to said torque transmission components, respectively, about said longitudinal axis.

10. A steering assembly as set forth in claim 9, one of said at least two torque transmittingly engaged torque transmission components being rotatably mounted about said longitudinal axis within a first telescopic carrier tube member and axially fixed with respect thereto, another one of said at least two torque transmittingly engaged torque transmission components being rotatably mounted within a second telescopic carrier tube member and axially fixed with respect thereto, said first and said second carrier tube members being telescopically engaged with each other for relative length adjustment along said longitudinal axis, said first and said second telescopic carrier tube members being non-rotatable about said longitudinal axis with respect to a bodywork of said motor vehicle, said first fluid-based positioning device being connected with both said first and said second telescopic carrier tube members for axial force transmission.

11. A steering assembly as set forth in claim 10, said second carrier tube member being tiltably mounted with respect to said bodywork about a tilting axis and being connected with a support bracket of the bodywork of said motor vehicle through a second length-adjustable, fluid-based positioning device.

12. A steering assembly as set forth in claim 1, said at least one fluid-based positioning device containing a filling of locking fluid independent of external fluid supply.

13. A steering assembly as set forth in claim 1, said at least one fluid-based positioning device comprising at least two positioning device components movable with respect to each other, said positioning device components being selectively movable and locked with respect to each other in response to valve means being opened and closed, respectively, said actuating unit being adapted for acting onto said valve means.

14. A steering assembly as set forth in claim 13, said at least one positioning device comprising a cylinder piston rod unit having an axis.

15. A steering assembly as set forth in claim 14, said actuating unit being secured to one of a cylinder member and a piston rod member of said cylinder piston rod unit.

16. A steering assembly as set forth in claim 14, said actuating unit acting in a direction substantially along said axis of said cylinder piston rod unit onto a valve control member of said valve means.

17. A steering assembly as set forth in claim 1, said actuating unit being connected-by a flexible control line with a control unit, said control unit comprising a control element accessible to the driver of said motor vehicle when sitting on the driver's seat.

18. A steering assembly as set forth in claim 1, respective actuating units of at least two positioning devices being controllable by a common control unit.

19. A steering assembly as set forth in claim 18, said actuating unit being controllable by a common control element for simultaneous locking and unlocking of said at least two positioning devices.

20. A steering assembly as set forth in claim 1, said electrically operated actuating unit comprising one of an electromotoric, an electromagnetic and a piezoceramic drive unit.

21. A steering assembly as set forth in claim 1, said actuating unit being releasably secured to said at least one fluid-based positioning device.

22. A steering assembly as set forth in claim 1, said actuating unit being non-releasably secured to said at least one fluid-based positioning device.

23. A steering assembly as set forth in claim 1, said positioning device being subject to influence of a security system.

24. A steering assembly as set forth in claim 23, said security system comprising sensor means sensing at least one operational parameter of said motor vehicle, said security system preventing adjustment of said at least one positioning device at a predetermined status of said operational parameter.

25. A steering assembly as set forth in claim 1, said at least one fluid-based positioning device being connected with said steering wheel by non-linear movement transmission means.

26. A steering assembly as set forth in claim 4, said second fluid-based positioning device being located substantially parallel to said longitudinal axis of said steering column and being connected to said steering column by a lever system deformable in response to tilting of said steering column about said tilting axis.

27. A steering assembly as set forth in claim 1, said at least one actuating unit being connected with a control unit, said control unit being adapted for maintaining said positioning device-through said actuating unit temporarily in an unlocked condition without a driver manually acting onto said control unit.

28. A steering assembly for being mounted in a motor vehicle comprising a steering wheel, said steering wheel being positionable in accordance with the driver's wishes by at least one fluid-based positioning device, an actuating unit being allocated to said positioning device for selectively permitting adjustment of said positioning device or locking said positioning device in a position corresponding to a desired position of said steering wheel, and a control unit connected to said at least one actuating unit for maintaining through said at least one actuating unit said fluid-based positioning device temporarily in an unlocked condition without intervention by the driver to permit adjustment of said positioning device, the control unit including one of a bi-stable device and a timer device.

29. A steering assembly as set forth in claim 28, respective actuating units of at least two positioning devices being controllable by a common control unit.

30. A steering assembly as set forth in claim 29, said actuating unit being controllable by a common control element for simultaneous locking and unlocking of said at least two positioning devices.

31. A steering assembly as set forth in claim 28 said at least one actuating unit comprising a structural part of said at least one fluid-based positioning device, said at least one fluid-based positioning device being connected to one of said steering assembly and a bodywork of said motor vehicle through said actuating unit.

32. A steering assembly as set forth in claim 28, said steering assembly being retained immovable by frictional forces when a respective fluid-based positioning device is unlocked.

33. A steering assembly as set forth in claim 28, a plurality of positioning devices being provided, said positioning devices being allocated to different positioning directions of said steering wheel.

34. A steering assembly as set forth in claim 28, said steering wheel being carried by a steering column having a longitudinal axis, said steering column being adjustable in length along said longitudinal axis and being lockable in a plurality of length adjustment positions by a first positioning device.

35. A steering assembly as set forth in claim 28, said steering wheel being carried by a steering column having a longitudinal axis, said steering column being tiltable about a tilting axis and being lockable in a plurality of tilting positions by a second positioning device.

36. A steering assembly as set forth in claim 35, said tilting axis being substantially transverse to said longitudinal axis.

37. A steering assembly as set forth in claim 36, said tilting axis being substantially horizontal and transverse to a normal driving direction of said motor vehicle.

38. A steering assembly as set forth in claim 28, said steering assembly comprising a steering column, said steering column having a longitudinal axis and comprising telescopic steering torque transmission means extending along said longitudinal axis, said telescopic steering torque transmission means having a first end portion in torque transmitting connection with said steering wheel and a second end portion for operational connection with steerable wheel means of said motor vehicle, said steering torque transmission means being rotatably mounted about said longitudinal axis by bearing means, said telescopic torque transmission means comprising at least two torque transmittingly engaged torque transmission components telescopically movable with respect to each other along said longitudinal axis, a first length-adjustable, fluid-based positioning device being connected for axial force transmission with both said torque transmission components for locking said torque transmission components in a plurality of relative length positions.

39. A steering assembly as set forth in claim 38, said bearing means being carried by a steering column carrier unit, said steering column carrier unit being tiltable about a tilting axis, a second fluid-based positioning device being provided for locking said steering column carrier unit in a plurality of tilting positions about said tilting axis.

40. A steering assembly as set forth in claim 38, said first length-adjustable, fluid-based positioning device being substantially stationary with respect to a bodywork of said motor vehicle in circumferential direction about said longitudinal axis, said first length-adjustable, fluid-based positioning device being located radially spaced from said longitudinal axis and being connected with both torque transmission components through respective first and second rotatable connecting means rotatable with respect to said torque transmission components respectively, about said longitudinal axis.

41. A steering assembly as set forth in claim 40, one of said at least two torque transmittingly engaged torque transmission components being rotatably mounted about said longitudinal axis within a first telescopic carrier tube member and axially fixed with respect thereto, another one of said at least two torque transmittingly engaged torque transmission components being rotatably mounted within a second telescopic carrier tube member and axially fixed with respect thereto, said first and said second carrier tube members being telescopically engaged with each other for relative length adjustment along said longitudinal axis, said first and said second telescopic carrier tube members being non-rotatable about said longitudinal axis with respect to a bodywork of said motor vehicle, said first fluid-based positioning device being connected with both said first and said second telescopic carrier tube members for axial force transmission.

42. A steering assembly as set forth in claim 41, said second carrier tube member being tiltably mounted with respect to said bodywork about a tilting axis and being connected with a support bracket of the bodywork of said motor vehicle through a second length-adjustable, fluid-based positioning device.

43. A steering assembly as set forth in claim 28, said at least one fluid-based positioning device containing a filling of locking fluid independent of external fluid supply.

44. A steering assembly as set forth in claim 28, said at least one fluid-based positioning device comprising at least two positioning device components movable with respect to each other, said positioning device components being selectively movable and locked with respect to each other in response to valve means being opened and closed, respectively, said actuating unit being adapted for acting onto said valve means.

45. A steering assembly as set forth in claim 44, said at least one positioning device comprising a cylinder piston rod unit having an axis.

46. A steering assembly as set forth in claim 45, said actuating unit being secured to one of a cylinder member and a piston rod member of said cylinder piston rod unit.

47. A steering assembly as set forth in claim 45, said actuating unit acting in a direction substantially along said axis of said cylinder piston rod unit onto a valve control member of said valve means.

48. A steering assembly as set forth in claim 28, said actuating unit being connected by a flexible control line with a control unit, said control unit comprising a control element accessible to the driver of said motor vehicle when sitting on the driver's seat.

49. A steering assembly as set forth in claim 28, said actuating unit being a control fluid-operated actuating unit connected by a control fluid conduit with a fluid control unit.

50. A steering assembly as set forth in claim 28, said actuating unit being an electrically operated actuating unit connected by electric power transmission means with an electric control unit.

51. A steering assembly as set forth in claim 50, said electrically operated actuating unit comprising one of an electromotoric, an electromagnetic and a piezo-ceramic drive unit.

52. A steering assembly as set forth in claim 28, said actuating unit being releasably secured to said at least one fluid-based positioning device.

53. A steering assembly as set forth in claim 28, said actuating unit being non-releasably secured to said at least one fluid-based positioning device.

54. A steering assembly as set forth in claim 28, said positioning device being subject to influence of a security system.

55. A steering assembly as set forth in claim 54, said security system comprising sensor means sensing at least one operational parameter of said motor vehicle, said security system preventing adjustment of said at least one positioning device at a predetermined status of said operational parameter.

56. A steering assembly as set forth in claim 28, said at least one fluid-based positioning device being connected with said steering wheel by non-linear movement transmission means.

57. A steering assembly as set forth in claim 35, said second fluid-based positioning device being located substantially parallel to said longitudinal axis of said steering column and being connected to said steering column by a lever system deformable in response to tilting of said steering column about said tilting axis.

* * * * *

UNITED STATES PATENT AND TRADEMARK OFFICE
CERTIFICATE OF CORRECTION

PATENT NO. : 5,449,199
DATED : September 12, 1995
INVENTOR(S) : Heinrichs et al.

It is certified that error appears in the above-indentified patent and that said Letters Patent is hereby corrected as shown below:

Col. 4, line 66, "On" should read --One--;
Col. 6, line 20, "annexted" should read --annexed--;
Col. 6, line 40, "4b" should read --4d--;
Col. 6, line 41, "device of" should read --device--;
Col. 6, line 51, "The +" should read --The--;
Col. 7, line 57, "piston unit" should read --piston unit 54--;
Col. 8, line 43, "FIGS. 5a to 5d" should read --FIGS. 4a to 4d--;
Col. 9, line 1, "within" should read --when--;
Col. 9, line 5, "the passage" should read --the--;
Col. 9, line 15, "5a" should read --4a--;
Col. 9, line 33, delete "passage";
Col. 10, line 40, "5d" should read --4d--;
Col. 10, lines 54-55, delete "in case of a cylinder piston".

Signed and Sealed this

Twenty-seventh Day of February, 1996

Attest:

BRUCE LEHMAN

*Attesting Officer*   *Commissioner of Patents and Trademarks*